April 9, 1963 A. CASTRO W. 3,084,473

TELEPHONE ATTACHMENT

Filed Feb. 16, 1960 2 Sheets-Sheet 1

Andres Castro W., INVENTOR.

BY Clarence A. O'Brien and Harvey B. Jacobson, Attorneys

April 9, 1963 A. CASTRO W. 3,084,473

TELEPHONE ATTACHMENT

Filed Feb. 16, 1960 2 Sheets-Sheet 2

Andres Castro W.

INVENTOR.

BY Clarence A. O'Brien and Harvey B. Jacobson

Attorneys 3,084,473

TELEPHONE ATTACHMENT

Andres Castro W., San Francisco, Calif., assignor of one-half to Josefana Castro, San Francisco, Calif.

Filed Feb. 16, 1960, Ser. No. 9,089
9 Claims. (Cl. 45—.5)

This invention relates to a telephone attachment and more particularly to a very convenient and easily applied attachment for furnishing all necessary information and data to receive and record telephone messages.

An object of the invention is to provide an easily applied, conventional telephone attachment which will not in any way interfere with normal telephone functioning and procedure and which will furnish in a very compact way such appliances as a calendar, telephone booklet, pad and appointment or telephone message blanks in such a way that each may be readily used.

Briefly, the invention is embodied in an attachment for a telephone which is secured to the telephone in such a manner that the dial (when a dial type phone is used) is fully exposed and unimpeded but which furnishes a portion of the mechanical support for the attachment. In addition, the attachment has a base in which there is a unique drawer which may be withdrawn and when withdrawn, automatically remains in the open position until it has served its purpose. The base also furnishes a very handy support for a booklet in position so that it may be easily referred to or written on.

The space between the switch operator buttons in the cradle of the telephone base is occupied by a calendar which automatically becomes exposed when the hand set of the telephone instrument is removed.

Accordingly, a further object of the invention is to provide an attachment essentially as aforesaid, but which is preferably made of reasonably flexible plastic so that the expense of manufacture is maintained very low and so that the attachment may be made in numerous colors and shade to be an attractive addition to an ordinary telephone.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 3:
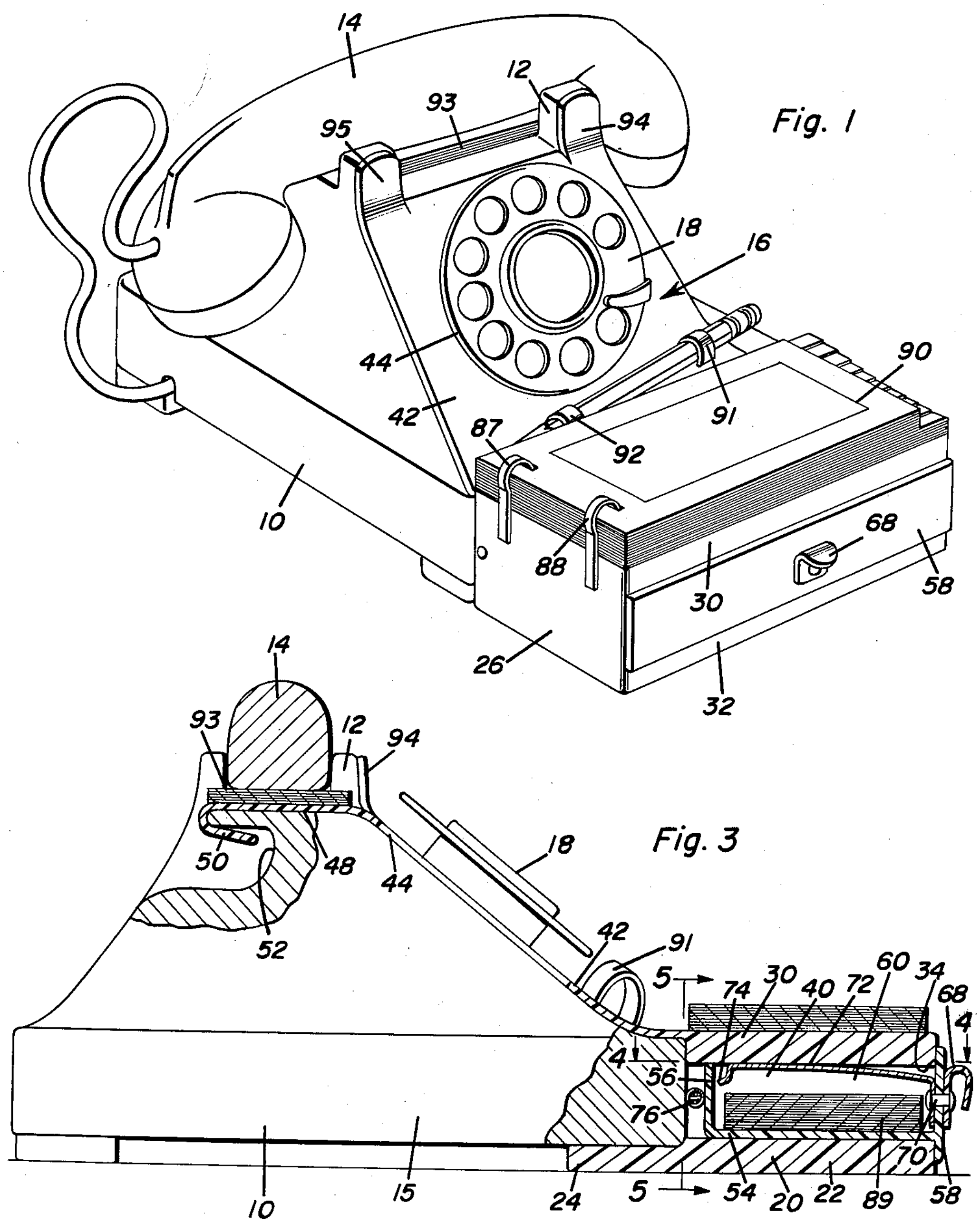
FIGURE 1 is a perspective view of a conventional telephone with an attachment in accordance with the invention applied thereto.
FIGURE 3 is a side elevational view of the telephone and the attachment in FIGURE 1 with portions broken away in section to illustrate various details of construction.

In the accompanying drawings there is an illustration of a telephone 10 which includes a cradle 12 and a hand set 14, although it is to be clearly understood that various types of telephones may be the recipient of attachment 16. For instance, there is a dial 18 constituting a part of the telephone 10, but the attachment 16 is equally well applicable to telephones which have no dial.

Attachment 16 is made of a base 20 of special configuration. The base has an essentially rectangular bottom wall 22 with a coplanar tongue 24 projecting from the rear edge thereof. This fits beneath the base 15 of telephone 10 while the remainder of bottom wall 22 forms a frontal extension of the telephone base 15. Two end walls 26 and 28 rise vertically from bottom wall 22, and there is a top wall 30 parallel to bottom 22 and attached to the upper edges of side walls 26 and 28. Front wall 32 is defined by the front edges of walls 30, 26, 28 and 22, respectively, and it has a drawer opening 34 therein to receive drawer 38 in the drawer cavity 40. The drawer cavity is formed by the space enclosed by the two end walls, the top wall and the bottom wall and the front wall of the base 20.

An elongate panel 42 of a shape similar to the angulated front face of the telephone 10, is integral with the rear edge of wall 30 and is flexible to conform to the sloping front face of the telephone instrument. Panel 42 has an opening 44 of a shape and size to receive the telephone dial 18. In telephones that have no dials, opening 44 may be omitted or made smaller so that only the telephone number which is sometimes placed in the space occupied by dial 18, may be exposed to view. The upper part 48 of panel 42 fits flush against the bottom of cradle in between the upwardly extending buttons which operate the switch mechanism of the telephone instrument. The rear extremity or extreme portion 50 of panel 42 is in the form of an essentially U-shaped clamp to engage in opening 52 formed in the rear part of the telephone instrument.

Figure 2:
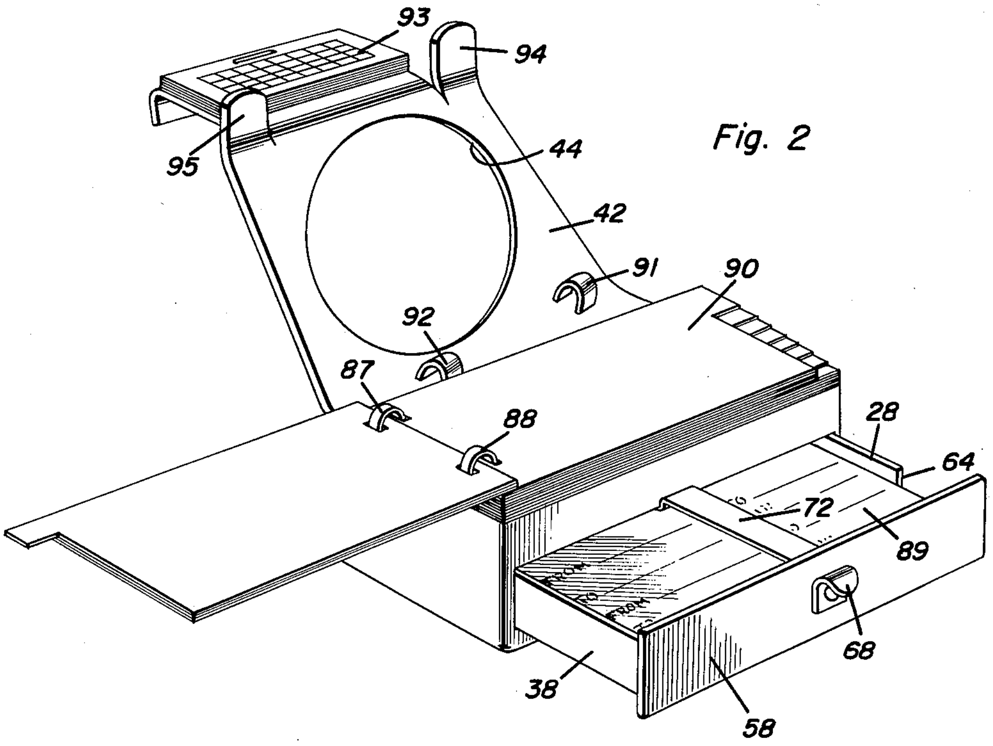
FIGURE 2 is a perspective view of the attachment removed from the telephone.
Figure 4:
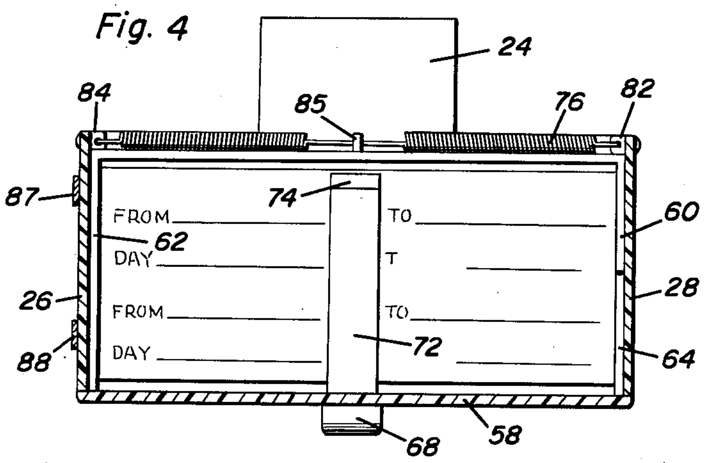
FIGURE 4 is a sectional view taken on the line 4—4 of FIGURE 3.
Figure 5:
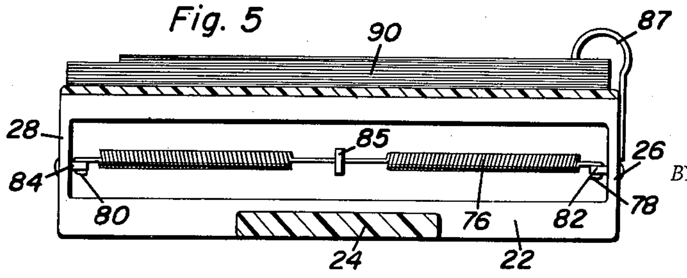
FIGURE 5 is a sectional view taken on the line 5—5 of FIGURE 3.

Drawer 38 has a bottom 54, a rear wall 56, a front wall 58 and two end walls 60 and 62. A finger receiving opening 64 is formed in the wall 60. Finger-grip 68 is attached, for example, by rivet 70, to the front wall 58 to facilitate withdrawing the drawer 38 from the drawer cavity. The same rivet 70 may be used to hold one end of leaf spring 72 which functions as a clamp to hold the drawer in the extended position (FIGURE 2). This is accomplished by an angulated keeper 74 formed at the inner extremity of leaf spring 72. The normal bias of spring 72 is against the lower surface of wall 30, and when the drawer is withdrawn an amount sufficient to have keeper 74 pass the front surface of wall 30, the leaf spring springs upwardly slightly to engage keeper 74 with the front edge of wall 30. This retains the drawer in the extended position against the yielding opposition of the return spring 76.

Return spring 76 is secured at its ends to walls 26 and 28, for example, by eyes 78 and 80 at the ends of spring 76 engaging in apertured ears 82 and 84 which are secured to walls 26 and 28. The center part of spring 76 is engaged in an apertured ear 84 that is fixed to the rear wall 56 of drawer 38.

A booklet 90 is attached to the top of wall 30. This booklet may be indexed for convenience of operation and consists of a plurality of sheets mounted on binder hooks 87 and 88 that are attached to wall 26. A supply of sheets or cards 89 for telephone messages, appointment information, etc. is disposed in drawer 38, and these are accessible more readily by the use of finger opening 64, when the drawer is in the withdrawn position (FIGURE 2). Apart from the pencil or pen receiving loops 91 and 92 which are attached to panel 42, the calendar 93 made of calendar pages stapled to portion 48 of panel 42, is the final part of attachment 16. The calendar occupies the space between the hand set 14 and the lower surface of cradle 12 and becomes immediately exposed to view when the hand set is removed from its cradle.

The entire attachment is preferably made of semi-flexible plastic, for instance, polyethylene. It is shaped to conform generally to the front of the telephone instrument with the two projections 94 and 95 that fit flush against the front faces of the members or cradle 12, providing a finished appearance for the slopping front of the telephone instrument. Projections 94 and 95 also cooperate with clamp 50 and the base 20 as well as tongue 24 to hold the attachment firmly in place on the telephone instrument but enable the attachment to be readily removed when it is desired to remove the same.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for a telephone instrument which has a body supported on downwardly extending spaced legs and a sloping face with a dial thereon, a cradle on the body to accommodate a hand set, said attachment comprising a base adapted to be disposed at and connected to the front edge of the telephone with at least the major portion of the base above the legs, said base having a bottom wall, side walls and a top wall joined together to define a drawer opening, a drawer in said drawer opening and adapted to accommodate materials, a panel extending rearwardly from said top wall to fit flush against the sloping face of the telephone instrument, means connected with said panel for engaging the telephone behind the cradle, and rearwardly extending means connected with said bottom wall and adapted to extend between the legs the base of the telephone instrument for aiding in retention of the attachment to the telephone instrument.

2. The subject matter of claim 1 wherein there are resilient means connected with the drawer for urging the drawer within the drawer opening, and means connected with the drawer and engageable with a portion of one of said walls for releasably retaining the drawer withdrawn from the opening.

3. The subject matter of claim 1 wherein said top wall supports a booklet on its upper surface, and said panel having a portion extending transversely through the area defined by said cradle and accommodating sheets to fit beneath the hand set of the telephone and automatically become exposed to view when the hand set is lifted.

4. The subject matter of claim 1 wherein said panel has an opening through which the dial extends.

5. The subject matter of claim 4 wherein said panel is made of flexible plastic material and wherein said means engaging the telephone instrument in the region of the cradle include an extreme end portion of said panel which is curved to form a clamp U-shaped in cross section.

6. In combination with a telephone instrument which has a telephone base having a front face with a lower vertically extending portion and an upper rearwardly canted portion, an attachment comprising a bottom wall, retaining means connected with said bottom wall and engageable beneath the telephone instrument base to hold the bottom wall in a position with reference to the base, side walls and a top wall connected together and said side walls joined to said bottom wall, said side walls and top wall located entirely in front of the telephone instrument base with the rear edges thereof abutting said vertically extending face portion, a panel extending rearwardly from said top wall and fitting flush against the canted face portion of the telephone instrument, means connected with the panel for securing the panel to the telephone instrument, said walls defining a substantially enclosed chamber.

7. In combination with a telephone instrument which has a telephone base a body supported on downwardly extending spaced legs and a sloping face with a dial thereon, an attachment comprising a bottom wall, retaining means connected with said bottom wall and engageable beneath the telephone instrument base to hold the bottom wall in a position with reference to the base, side walls and a top wall connected together and said side walls joined to said bottom wall, said side walls and top wall located entirely in front of the telephone instrument base with the rear edges thereof abutting said vertically extending face portion, a panel extending rearwardly from said top wall and fitting flush against the canted face portion of the telephone instrument, means connected with the panel for securing the panel to the telephone instrument, said walls defining a substantially enclosed chamber, information retention means located within said chamber.

8. In combination with a telephone instrument which has a telephone base a body supported on downwardly extending spaced legs and a sloping face with a dial thereon, an attachment comprising a bottom wall, retaining means connected with said bottom wall and engageable beneath the telephone instrument base to hold the bottom wall in a position with reference to the base, side walls and a top wall connected and said side walls joined to said bottom wall, said side walls and top wall located entirely in front of the telephone instrument base with the rear edges thereof abutting said vertically extending face portion, a panel extending rearwardly from said top wall and fitting flush against the canted face portion of the telephone instrument, means connected with the panel for securing the panel to the telephone instrument, said walls defining a substantially enclosed chamber, a drawer in the chamber, and means connected with the drawer for releasably retaining the drawer in an extended position to expose the contents of the drawer.

9. The subject matter of claim 8 wherein there are resilient means connected with said drawer for withdrawing said drawer to the retracted position between said top and bottom walls.

References Cited in the file of this patent

UNITED STATES PATENTS

| | | |
|---|---|---|
| 2,473,775 | Allen et al. | June 21, 1949 |
| 2,586,543 | Kennedy | Feb. 19, 1952 |
| 2,624,965 | Griswold | Jan. 13, 1953 |
| 2,661,961 | Mohundro | Dec. 8, 1953 |
| 2,968,110 | Quarnstrom | Jan. 17, 1961 |